United States Patent [19]

Matsumoto et al.

[11] Patent Number: 4,661,718
[45] Date of Patent: Apr. 28, 1987

[54] INFORMATION AND ELECTRICAL POWER TRANSMISSION SYSTEM AND METHOD FOR VEHICLE

[75] Inventors: Muneaki Matsumoto; Shigeyuki Akita, both of Okazaki; Akira Kuno, Oobu, all of Japan

[73] Assignees: Nippondenso Co., Ltd., Kariya; Nippon Soken, Inc., Nishio, both of Japan

[21] Appl. No.: 742,060

[22] Filed: Jun. 6, 1985

[30] Foreign Application Priority Data

Jun. 7, 1984 [JP] Japan .................................. 59-115375
Mar. 7, 1985 [JP] Japan .................................. 60-46190

[51] Int. Cl.$^4$ ............................................ H02G 3/00
[52] U.S. Cl. ................................. 307/10 R; 307/10 LS
[58] Field of Search ...................... 307/10 R, 9, 10 LS, 307/146; 60/906; 323/905

[56] References Cited

U.S. PATENT DOCUMENTS

| | | | |
|---|---|---|---|
| 3,112,850 | 12/1963 | Garibotti | 219/121 LJ X |
| 3,649,806 | 3/1972 | Konig | 219/121 LG |
| 4,324,986 | 4/1982 | Hara et al. | 307/10 LS |
| 4,340,824 | 7/1982 | Shaw | 307/10 R X |
| 4,386,279 | 5/1983 | Yoshimi et al. | 307/10 R |
| 4,438,425 | 3/1984 | Tsuchida et al. | 307/10 R X |
| 4,453,088 | 6/1984 | Moore | 307/10 R |
| 4,504,082 | 3/1985 | Brown, Jr. et al. | 307/10 R X |
| 4,532,432 | 7/1985 | Mizuno et al. | 307/10 R |
| 4,538,262 | 8/1985 | Sinniger et al. | 307/10 R X |
| 4,554,461 | 11/1985 | Oho et al. | 307/10 R X |
| 4,560,885 | 12/1985 | Naete et al. | 307/10 R |

*Primary Examiner*—William M. Shoop, Jr.
*Assistant Examiner*—Sharon D. Logan
*Attorney, Agent, or Firm*—Cushman, Darby & Cushman

[57] ABSTRACT

Disclosed is an information and electrical power transmission system. In this system, when required, i.e., when an ignition keyswitch is in an ON state, a plurality of information and electrical power are transmitted from an electrical power supply side to an electrical power receiving side through a signal line, and, at the same time, a plurality of information can be transmitted through the signal line from the electrical power receiving side to the electrical power supply side. When the ignition keyswitch is in an OFF state, information which is required to be always transmitted can be transmitted with a low power consumption, so that the information and electrical power necessary for a vehicle are suitably transmitted.

12 Claims, 15 Drawing Figures

INFORMATION AND ELECTRICAL POWER TRANSMISSION SYSTEM AND METHOD FOR VEHICLE

BACKGROUND OF THE INVENTION (1) Field of the Invention

The present invention relates to an information and electrical power transmission system and method for a vehicle. The system according to the present invention is used in a vehicle to exchange information between a controlling part in the vehicle steering device and a controlling part in the vehicle body.

(2) Description of the Related Art

A conventional device, which adopts a multiplex communication method to transmit signals from various switches provided on a vehicle steering, uses light to perform the transmission, or performs the transmission electrically through a slip ring of the vehicle. Such a device, however, transmits information only from the switches provided on the vehicle steering to the vehicle body and does not illuminate the switches provided on the steering when driving the vehicle at night, and accordingly, such a conventional device is not satisfactory.

A multiplex communication device is known which transmits electric power and information simultaneously. Such a multiplex communication device also is not satisfactory, because, when an ignition keyswitch is in an OFF state, the device does not carry out the transmission/reception of information which should be always available, such as horn information, separately from the transmission/reception of information which is not required to be always available.

SUMMARY OF THE INVENTION

It is an object of the present invention to enable the transmission of electrical power and a plurality of information when needed, i.e., when an ignition keyswitch is in an ON state, from an electrical power supply side to an electrical power receiving side through a signal line, and to transmit a plurality of information from the electric power receiving side to the electric power supply side through the signal line, and further, when the ignition keyswitch is in an OFF state, to enable the transmission of information which is always required with a low power consumption (for example, about one eightieth or less of that when the ignition keyswitch is in an ON state) from the electrical power receiving side to the electrical power supply side, thereby performing a suitable transmission of the information and electrical power necessary for the operation of the vehicle.

A conventional switching device for a vehicle which commands the setting, release, etc., of an auto drive device is disclosed in, for example, Japanese Unexamined Patent Publication (Kokai) No. 56-142726, Japanese Unexamined Utility Model Publication (Kokai) No. 56-166949, and Japanese Unexamined Patent Publication (Kokai) No. 56-163933, all of which were invented by one of the inventors of the present invention and correspond to U.S. Pat. No. 4,386,279.

According to the fundamental aspect of the present invention, there is provided an information and electrical power transmission system for a vehicle, comprising a first information transmitting device connected to a first group of electrical devices and to a power supply circuit having an ignition keyswitch; a second information transmitting device connected to a second group of electrical devices; and a signal line which connects the second information transmitting device with the first information transmitting device for transmitting a plurality of information and electrical power between the first and second information transmitting devices; this plurality of information and electrical power being transmitted through the signal line when the ignition keyswitch is in an ON state, and only information required to be always transmitted being transmitted through the signal line when the ignition keyswitch is in an OFF state.

According to another aspect of the present invention, there is provided an information and electrical power transmission system for a vehicle, comprising a power supply circuit having an ignition keyswitch; a first group of electrical devices connected to the power supply circuit; a first information transmitting device connected to the first group of electrical devices and to the power supply circuit; a second group of electrical devices provided remote from the first group of electrical devices on the vehicle; a second information transmitting device connected to the second group of electrical devices; a signal line connecting the second information transmitting device to the first information transmitting device for transmitting a plurality of information and electrical power between the first and second information transmitting devices; a switching device for the transmitting route which detects an ON/OFF state of the ignition keyswitch and switches the transmitting route for transmitting the plurality of information and electrical power between the first and second information transmitting devices through the signal line when the ignition keyswitch is in an ON state and switches the transmitting route for transmitting only information which is required to be always transmitted between the first and second information transmitting devices through the signal line when the ignition keyswitch is in an OFF state; and a power reducing device which reduces electrical power supplied to the switching device from the power supply circuit when the switching device is in the switched state after detection of the OFF state of the ignition keyswitch.

According to a further aspect of the present invention, there is provided a method for transmitting information and electrical power for a vehicle, wherein, when transmitting a plurality of information and electrical power through a signal line between a first and second group of electrical devices installed at locations separate from each other on the vehicle, the plurality of information and electrical power are transmitted through the signal line when the ignition keyswitch is in an ON state, and only information which is required to be always transmitted is transmitted through the signal line when the ignition keyswitch is in an OFF state.

In the system according to the present invention, the following operation is carried out.

(a) When the ignition keyswitch is in an ON state:

Information output from the second group of electrical devices is transmitted to the first group of electrical devices through the second information transmitting device, a signal line and a first information transmitting device in turn, and the devices included in the first group of electrical devices are actuated by an output supplied from the power supply circuit.

On the other hand, the second group of electrical devices are supplied with electrical power from the power supply circuit through the first information transmitting device, a signal line, and the second information transmitting device in turn, and information output from the first group of electrical devices is transmitted to the second group of electrical devices through the first information transmitting device, a signal line, and the second information transmitting device in turn to actuate the devices included in the second group of electrical devices.

(b) When the ignition keyswitch is in an OFF state:

Only information which is required to be always transmitted (e.g., horn information) is transmitted from the second group of electrical devices to a certain device only (e.g., a horn) included in the first group of electrical devices in the same manner as that described above to actuate the certain device. Other devices included in the first and second electrical devices are not supplied with electrical power at this time.

The amount of electrical power supplied from the power supply circuit to the switching device for controlling the transmitting routes is reduced by the power reducing device.

DESCRIPTION OF THE PREFERRED EMBODIMENTS

Figures 1, 1A:
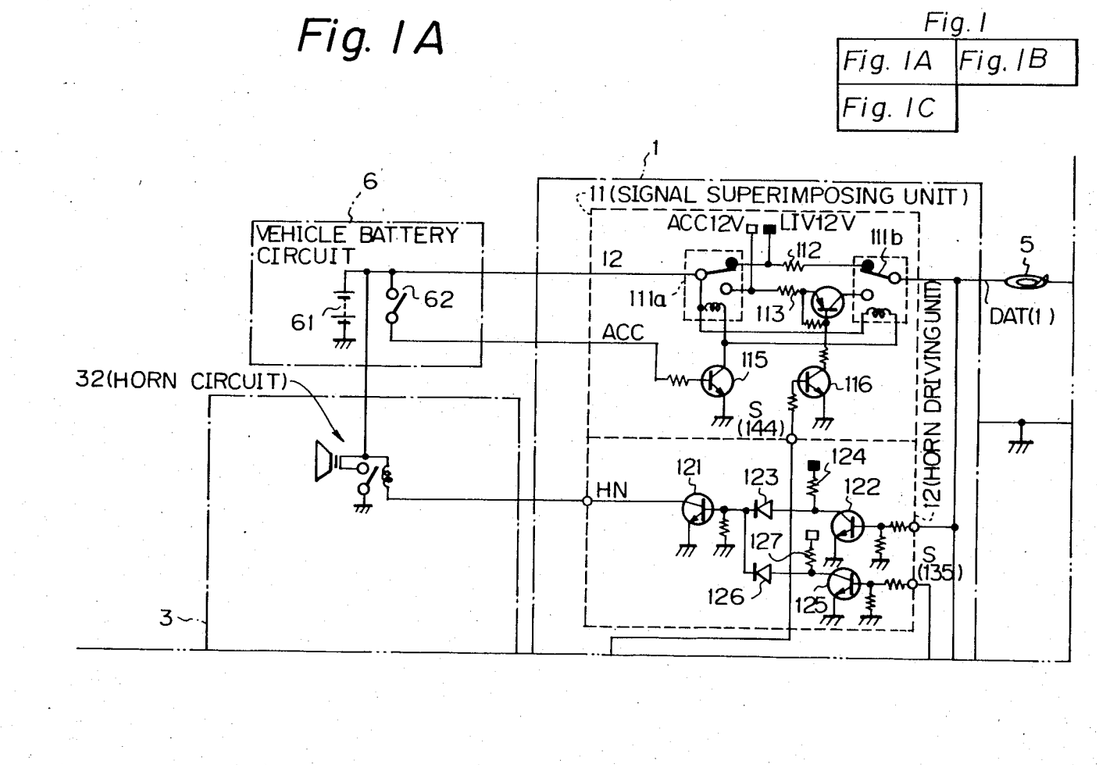
FIG. 1A-C is a diagram showing an information and electrical power transmission system for a vehicle according to an embodiment of the present invention.
Figure 1B:
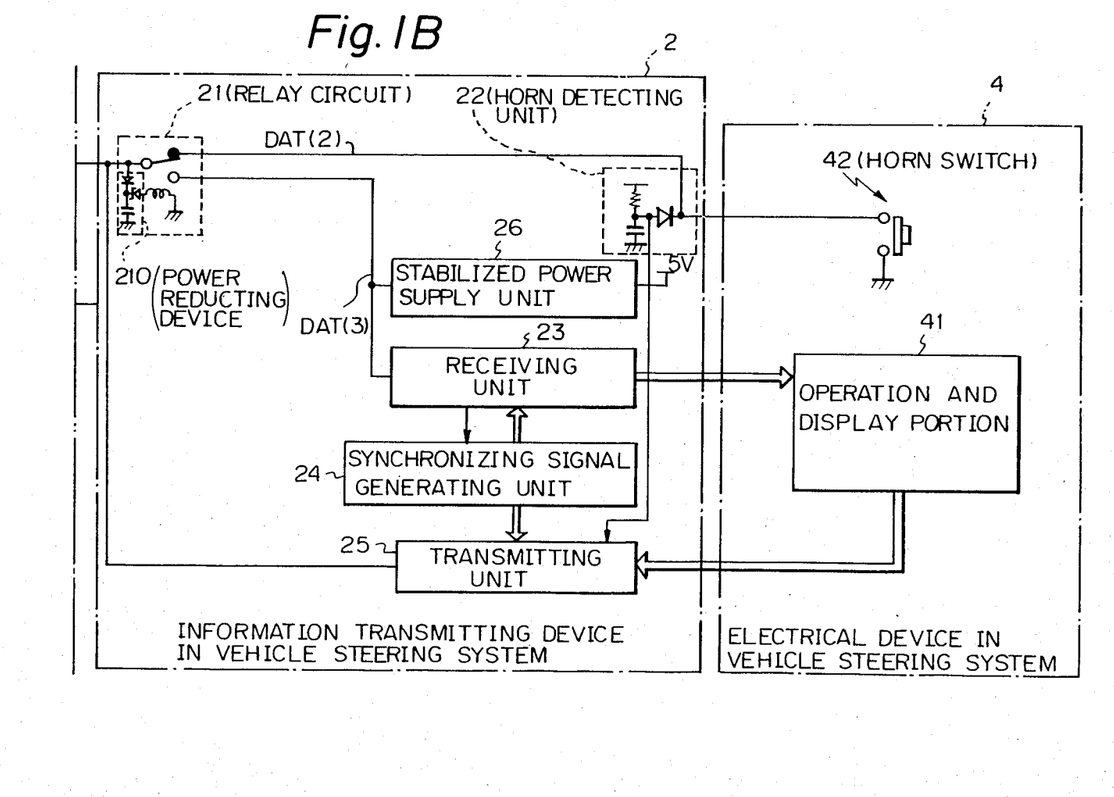
Figure 1C:
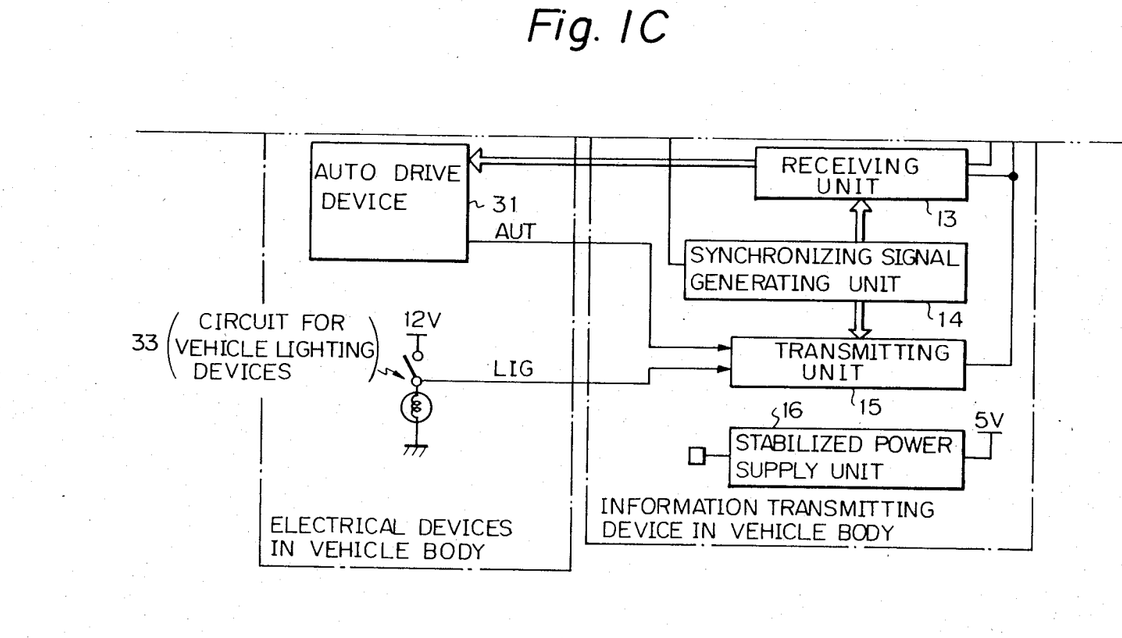

FIG. 1 shows an information and electrical power transmission system according to an embodiment of the present invention.

The system shown in FIG. 1 has the following constitution. Namely, an information transmitting device 1 in a vehicle body; an information transmitting device 2 in a vehicle steering system; a group of electrical devices 3 in the vehicle body, such as an auto drive device 31, a horn circuit 32 and a circuit for vehicle lighting devices 33; a vehicle slip ring 5; a vehicle battery circuit 6; a switching device for switching the transmitting routes, which comprises relays 111a and 111b, a relay 21, and a power reducing device 210; and a group of electrical devices 4 in the vehicle steering system, such as an operation and display portion 41 and a horn switch 42. When an ACC (accessory) switch 62 in the battery circuit 6 is in an ON state, information from the group of electrical devices 4 in the vehicle steering system and information from the group of electrical devices 3 in the vehicle body are transmitted via the vehicle slip ring 5. When the ACC switch 62 is in an OFF state, only information from the horn switch 42 can be transmitted to the horn circuit 32.

When the group of electrical devices 3 in the vehicle body includes the auto drive device 31, the operation of the system shown in FIG. 1 is as follows:

(1) The kind of information and electrical power to be transmitted from the vehicle body is as follows;

(a) auto drive operation information indicating that the auto drive device is in operation, (b) lighting information indicating that lighting is required at night, and (c) electrical power.

(2) The kind of information to be transmitted from the vehicle steering system is as follows:

(a) setting information from a setting switch which is actuated to drive the vehicle at a constant speed at a certain moment, (b) canceling information from a canceling switch which is operated to release the constant speed drive, (c) resuming information from a resuming switch which is operated after the constant speed drive has been released, to drive the vehicle again at the previous constant speed, and (d) horn information from the horn switch which is operated to actuate the horn.

The information transmitting device 1 in the vehicle body includes the following means: signal superimposing means 11; horn driving means 12; receiving means 13 in the vehicle body; synchronizing signal generating means 14 in the vehicle body; transmitting means 15 in the vehicle body; and a stabilized power source 16 in the vehicle body.

Figure 2:
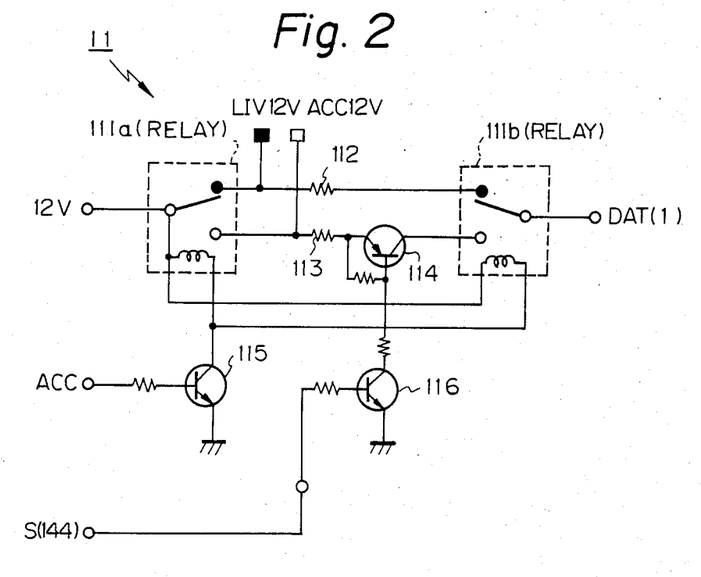
FIG. 2 is a diagram showing the constitution of a signal superimposing means of the system shown in FIG. 1.

The signal superimposing means 11 is now explained with reference to FIG. 2. When an ACC switching signal from the ACC switch 62 in the battery circuit 6 is at a low level, i.e., when the ACC switch 62 is in an OFF state, the relays 111a and 111b are connected to an L1V12V side shown in FIG. 2 to output a signal DAT(1) of a divided voltage level of a resistor 112 (e.g., having a resistance value of 10 KΩ) and the virtual resistance of the relay circuit 21 (to be explained later) in the vehicle steering system. When the ACC switch 62 is in an ON state, the ACC switching signal reaches a HIGH level (12 V) and turns ON a transistor 115, connecting the relays 111a and 111b to an ACC12V side shown in FIG. 2. If a reset signal S(144) generated by the synchronizing signal generating means 14 (to be explained later) in the vehicle body reaches a HIGH level, transistors 114 and 116 are turned ON in response to the reset signal S(144), and the ACC12V outputs the signal DAT(1) through a resistor 113 (e.g., having a resistance value of 4.7 Ω). If the reset signal S(144) is reset to a LOW level, the transistors 114 and 116 are turned OFF to set the signal DAT(1) to a ground level.

Figure 3:
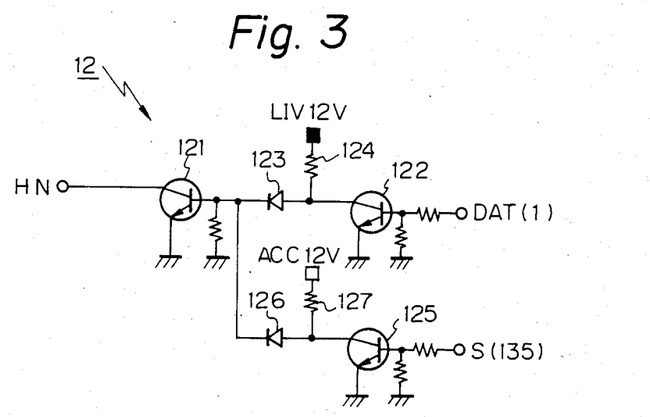
FIG. 3 is a diagram showing the constitution of a horn driving means of the system shown in FIG. 1.

The horn driving means 12 is now explained with reference to FIG. 3. As explained above, the signal DAT(1) reaches a divided voltage level of the resistor 112 and the virtual resistance of the relay circuit 21 when the ACC switch 62 is in an OFF state, turning ON transistor 122 and turning OFF transistor 121. If the horn switch 42 is turned ON, the signal DAT(1) reaches a ground level, turning OFF transistor 122 and turning ON transistor 121 to receive a signal from LIV12V, which is a voltage of 12 V constantly supplied from a battery 61 without passing through the switch, via resistor 124 and diode 123, thereby actuating a horn in a horn circuit 32. When the ACC switch 62 is turned ON and a signal S(135) from the receiving circuit 13 in the vehicle body is at a HIGH level, transistor 125 is turned ON and transistor 121 is turned OFF in response to the signal S(135). When the signal S(135) is at a LOW level, transistor 125 is turned OFF and transistor 121 is turned ON to actuate the horn in the horn circuit 32.

Figure 4:
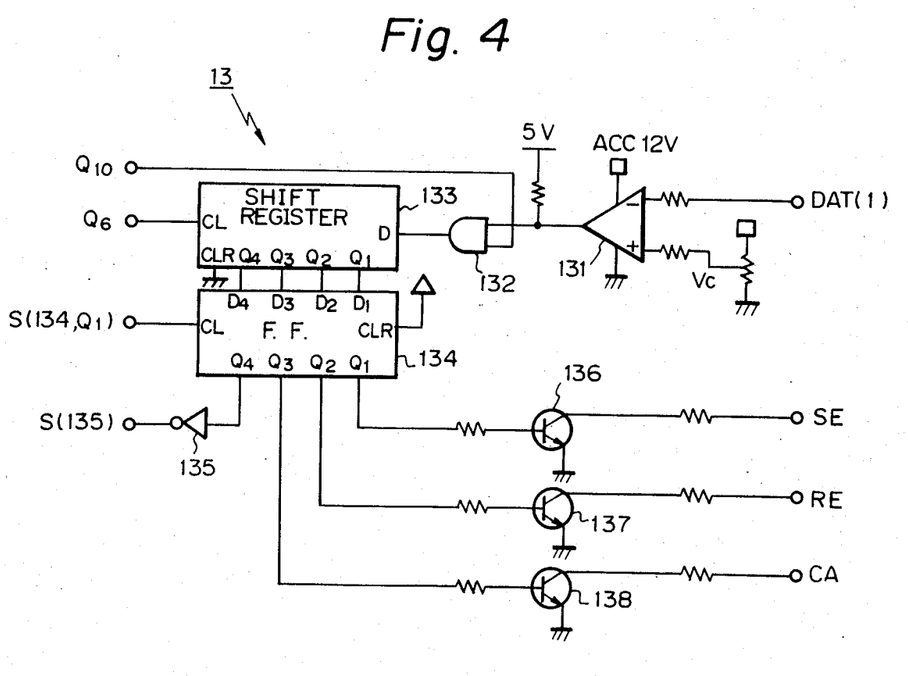
FIGS. 4 and 5 are diagrams showing the constitution of a receiving means in the vehicle body of the system shown in FIG. 1.
Figure 5:
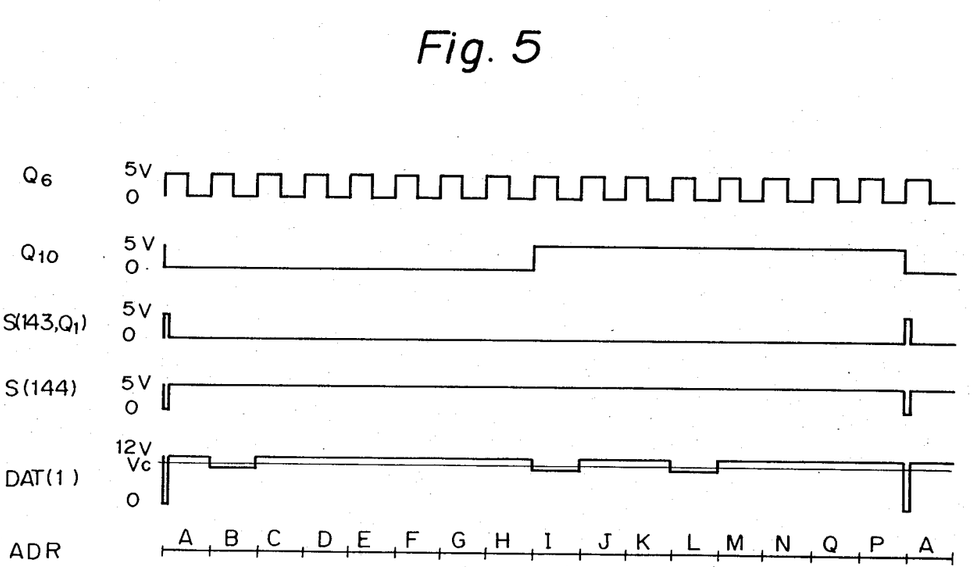

The receiving circuit 13 in the vehicle body is now explained with reference to FIGS. 4 and 5. When the ACC switch 62 is turned ON, the signal DAT(1) becomes a voltage level signal as shown in FIG. 5. ADR in FIG. 5 represents addresses. FIG. 5 shows a state in which a setting switch in the operation and display portion 41, and the horn switch 42 are turned ON and the auto drive operation information from an auto drive device 31 in the vehicle body is transmitted. A comparator 131 (e.g., HITACHI HA17903) compares the voltage level of the signal DAT(1) with a reference voltage level Vc to detect information being transmitted. An AND gate 132 discriminates information received from the vehicle steering system from the transmitted information in the signal DAT(1), and outputs the result to an input terminal DAT(1) of a shift register 133 (e.g., TOSHIBA TC4015). The shift register 133 converts serial signals from the input terminal DAT(1) into parallel signals to output the same from its output terminal. In the example shown in FIG. 5, a setting information signal registered in an address I is output as a HIGH level signal from a terminal Q1, a resuming information signal registered in an address J is output as a LOW level signal from a terminal Q2, a canceling information signal registered in an address K is output as a LOW level signal from a terminal Q3, and a horn information signal registered in an address L is output as a HIGH level signal from a terminal Q4. The above described operation is carried out in the following sequence:

| Address | Contents |
| --- | --- |
| B | Auto drive operation information |
| C | Lighting information |
| I | Setting information |
| J | Resuming information |
| K | Canceling information |
| L | Horn information |

A D-type flip-flop 134 (e.g., TOSHIBA TC40174) latches and outputs the parallel signal from the shift register 133 at the rise of a latching signal S(143, Q1). Transistors 136, 137, and 138 respond to the output signals from the D-type flip-flop 134, and output a setting signal (SE), a resuming signal (RE), and a canceling signal (CA) respectively to the auto drive device 31. The horn information signal from the terminal Q4 of the D-type flip-flop 134 is output as the signal S(135) to the horn driving circuit 12 via an inverter 135.

Figure 6:
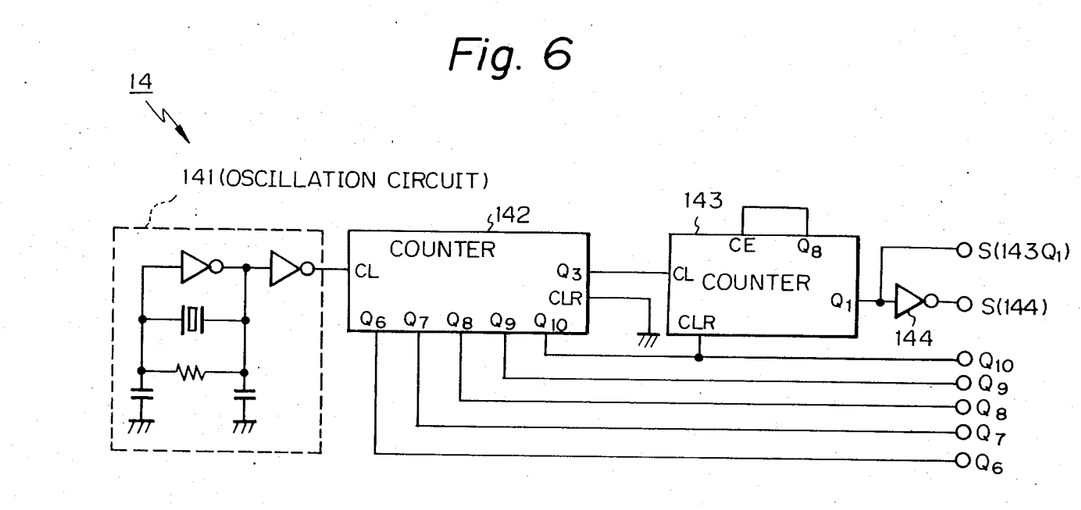
FIG. 6 is a diagram showing the constitution of a synchronizing signal generating means in the vehicle body of the system shown in FIG. 1.

A synchronizing signal generating means 14 in the vehicle body is now explained with reference to FIG. 6. The numeral 141 represents a known oscillation circuit comprising a ceramic oscillator, a resistor, capacitors, and inverters. The oscillation circuit 141 outputs a reference oscillation signal to a terminal CL of an up-counter 142 (e.g., TOSHIBA TC4040). In response to this reference oscillation signal, the up-counter 142 outputs predetermined oscillation frequency signals Q3 and Q6 to Q10. A counter 143 (e.g., TOSHIBA TC4017) outputs a latching signal S(143, Q1) in response to the signals Q3 and Q10 having predetermined frequencies. An inverter 144 inverts the latching signal and outputs the result as a reset signal S(144).

Figure 7:
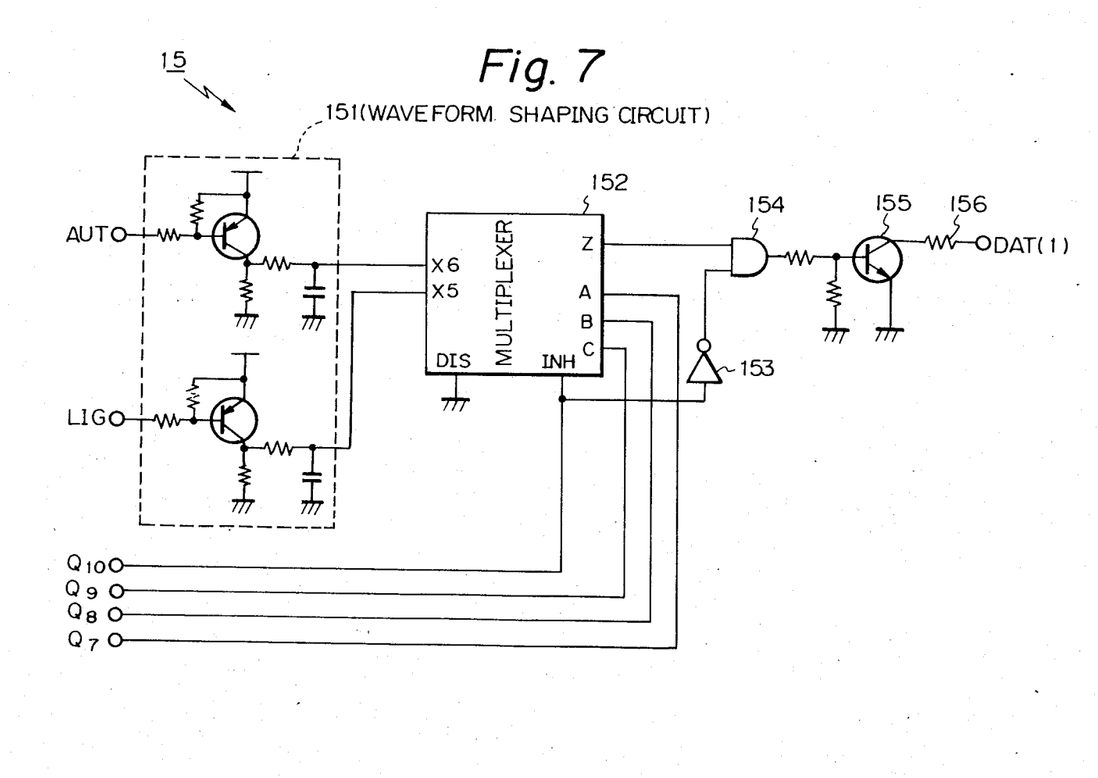
FIG. 7 is a diagram showing the constitution of a transmitting means in the vehicle body of the system shown in FIG. 1.

The transmitting means 15 in the vehicle body is now explained with reference to FIG. 7. Numeral 151 represents a waveform shaping circuit comprising transistors, resistors, and capacitors. The circuit 151 outputs signals to a multiplexer 152 (e.g. TOSHIBA TC4512) in response to the auto drive operation information (AUT) from the auto drive device 31 and the lighting information (LIG) from the circuit 33 for lighting small lamps provided on the outside portion of the vehicle and lamps for illuminating a meter panel. The multiplexer 152 converts the information into serial signals in accordance with various oscillation signals from the synchronizing signal generating means 14 in the vehicle body, and outputs the result from its terminal. An AND gate 154 operates the logical product between the serial signals and an inverted signal of the signal Q10, and outputs the result to a transistor 155. The transistor 155 responds to the auto drive operation information and lighting information to change the voltage of the signal DAT(1) through a resistor 156. (Refer to FIG. 5.)

Numeral 16 represents a stabilized power supply means in the vehicle body, which receives ACC12V and supplies a stabilized power of 5 V to electrical circuits when the ACC switch 62 is in an ON state.

The constitution of the information transmitting device 2 in the vehicle steering system will now be explained. The information transmitting device 2 in the vehicle steering system comprises the following means: a relay circuit 21; a horn detecting means 22; a receiving means 23 in the vehicle steering system; a synchronizing signal generating means 24 in the vehicle steering system; a transmitting means 25 in the vehicle steering system; and a stabilized power supply means 26 in the vehicle steering system.

Figure 12:
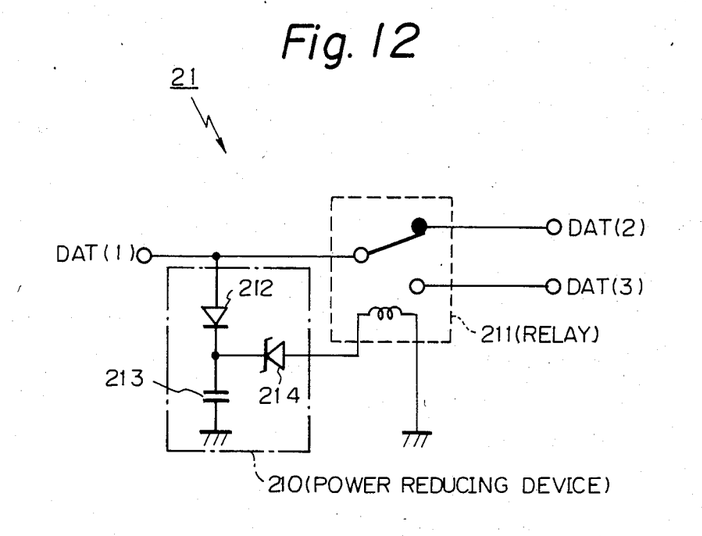
FIG. 12 is a diagram showing the constitution of a relay circuit of the system shown in FIG. 1.

The relay circuit 21 automatically judges the ON/OFF state of the ACC switch 62 according to a signal DAT(1) sent from the information transmitting device 1 in the vehicle body via the slip ring 5, and switches the connection through which the signal DAT(1) is transmitted. The latter will now be explained with reference to FIG. 12. When the ACC switch 62 is in an ON state, a rated current passes through the resistor 113 (having a resistance of 4.7 Ω in this embodiment) and the transistor 114 as mentioned above, and flows through a diode 212, a Zener diode 214 (NEC RD4.7BE), and the coil of a relay 211 (OMRON LAD001-5 V) to turn ON the relay 211, thereby switching the connection to the ACC12V side shown in FIG. 1 to make the signal DAT(1) and the signal DAT(3) equal to each other. The diode 212 and a capacitor 213 are adopted to smooth the voltage change of the signal DAT(1) and to ensure a constant flow of the rated current through the coil of the relay 211 when the ACC switch 62 is in an ON state. When the ACC switch 62 is in an OFF state, a current passes through the resistor 112 (having a resistance of 10 kΩ in the embodiment) as mentioned above, and flows through the diode 212, Zener diode 214, and the coil of the relay 211. Since the value of the resistor 112 is quite large, a current flowing through the Zener diode 214, i.e., a Zener current, is limited so that the resistance component of the Zener diode 214 is increased. As a result, the virtual resistance of the relay circuit 21 is increased to about 15 kΩ in the present embodiment, thus making a quiescent current flowing through the coil of the relay 211 about 0.5 mA. In this case, the relay 21 is switched to the LIV12V side shown in FIG. 1, whereby signals DAT(1) and DAT(2) become equal to each other.

Figure 13:
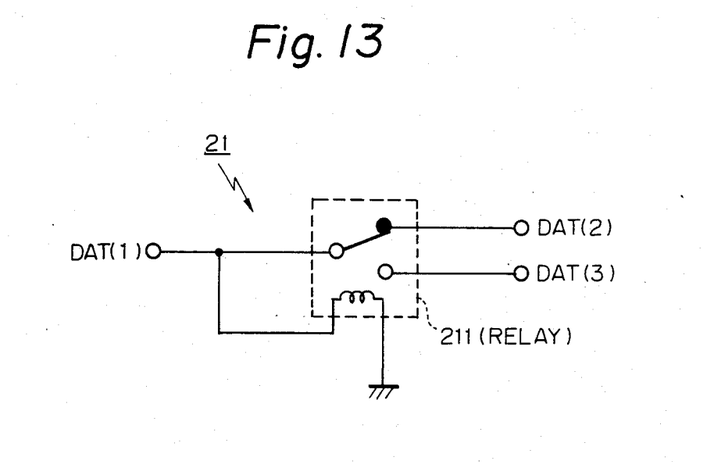
FIG. 13 is a diagram showing another constitution of a relay circuit of the system shown in FIG. 1.

As explained above, the relay circuit 21 shown in FIG. 12 is provided with the power reducing device 210 comprising the diode 212, the capacitor 213, and the Zener diode 214. However, the relay circuit 21 can be constituted by the relay 211 only, as shown in FIG. 13. In the case of FIG. 13, the resistance of the resistor 122 is selected to be a little less than that in the case of FIG. 12.

A horn detecting means 22 detects horn information from the horn switch 42 and outputs a signal DAT(2) and a horn information signal, both of which are at a LOW level when the horn switch 42 is in an ON state.

Figure 8:
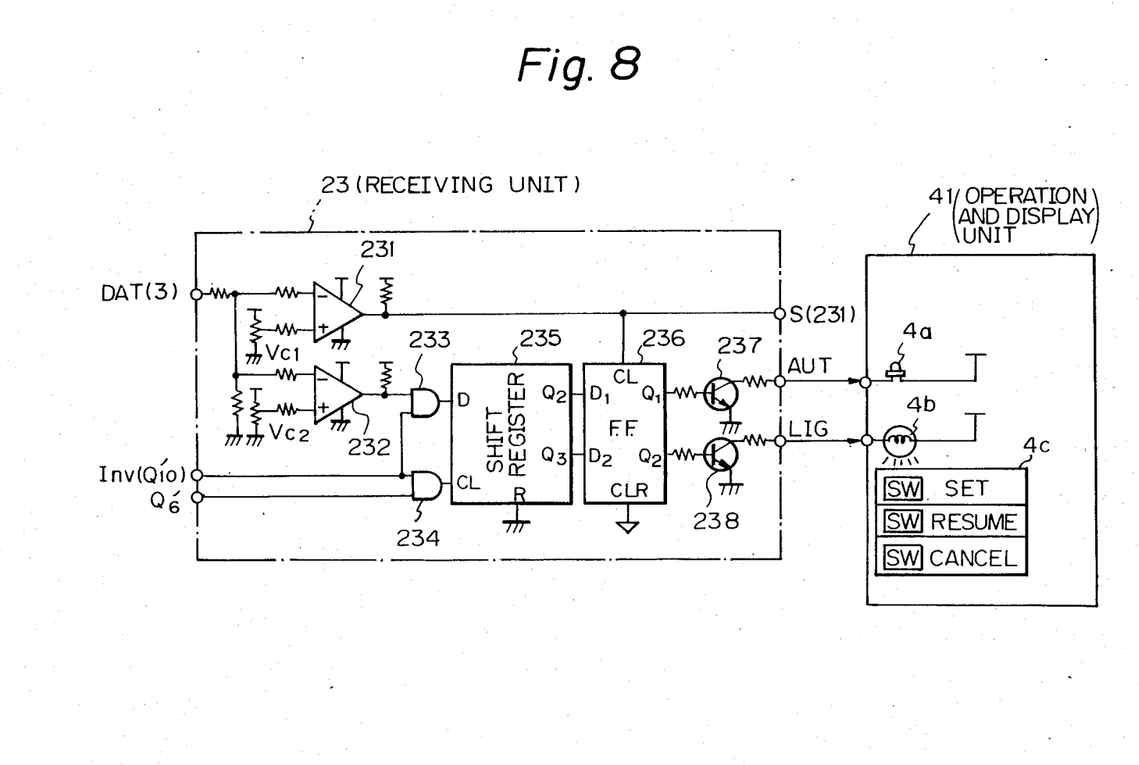
FIG. 8 is a diagram showing the constitution of a receiving means in a vehicle steering system of the system shown in FIG. 1.

The receiving means 23 in the vehicle steering system will now be explained with reference to FIG. 8. Comparator 231 (e.g., HITACHI HA17903) compares the signal DAT(3) with a predetermined reference voltage level $V_{c1}$, detects a reset signal which is a synchronizing signal from the information transmitting device 1 in the vehicle body, and outputs the result as a signal S(231). A comparator 232 (e.g., HITACHI HA17903). compares the signal DAT(1) with a predetermined reference voltage level $V_{c2}$, detects the auto drive information (AUT) and the light information (LIG) from the information transmitting device 1 in the vehicle body, and outputs the result to AND gate 233.

AND gate 233 operates a logical product between the information signal and an oscillation signal $I_{nv}(Q10')$ from the synchronizing signal generating means 24 in the vehicle steering system, discriminates only information sent from the vehicle body, and outputs it to an input terminal DAT (1) of a shift register 235 (e.g., TOSHIBA TC4015). AND gate 234 operates a logical product between the oscillation signals $I_{nv}(Q10')$ and Q6' from the synchronizing signal generating means 24 in the vehicle steering system, and outputs the result to an input terminal "CLOCK" of the shift register 235. The shift register 235 converts serial signals from the input terminal DAT(1) into parallel signals, and outputs the result from its output terminal. In the embodiment shown in FIG. 5, an auto drive information signal assigned to an address B is output as a HIGH level signal from a terminal Q2, and a lighting information signal assigned to an address C is output as a LOW level signal from a terminal Q3.

A D-type flip-flop 236 (e.g., TOSHIBA TC40174) latches the signal sent from the shift register 235 at the rise of the output signal S(231) from the comparator 231, and outputs the result. Transistors 237 and 238 respond to the signals from the D-type flip-flop 236, and output an auto drive information signal as an auto drive signal (AUT) and the lighting information signal as a lighting signal (LIG) respectively to the operation and display portion 41 in the vehicle steering system.

As a result, when the signal (AUT) is output, a light emitting diode 4a in the operation and display portion 41 in the vehicle steering system is energized to inform the driver that the auto drive device is in operation. When the signal (LIG) is output, a lamp 4b is energized to illuminate an operational unit 4c provided on the operation and display portion 41 in the vehicle steering system.

Figure 9:
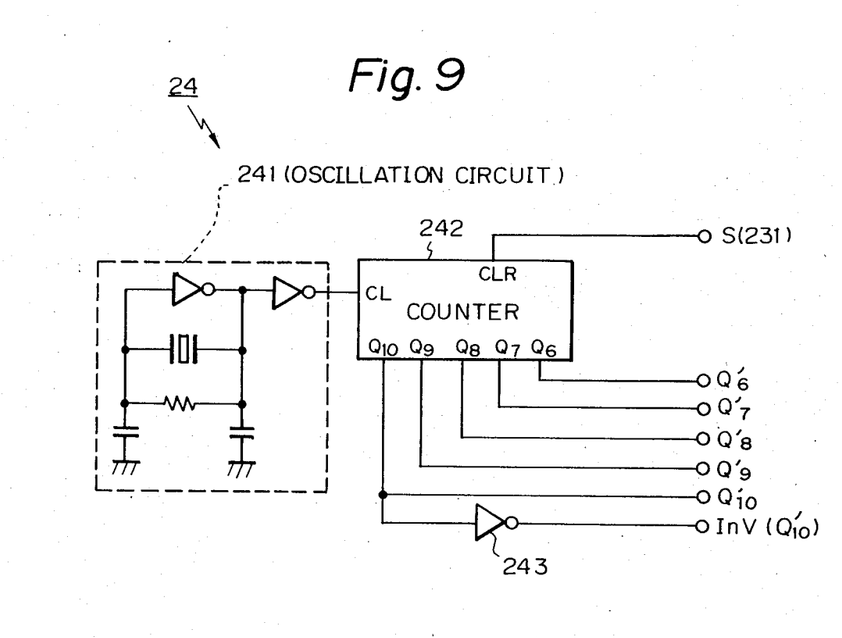
FIG. 9 is a diagram showing the constitution of a synchronizing signal generating means in the vehicle steering system of the system shown in FIG. 1.

The synchronizing signal generating means 24 in the vehicle steering system is now explained with reference to FIG. 9. Numeral 241 represents a known oscillation circuit comprising a ceramic oscillator, a resistor, capacitor, and inverters. The oscillation circuit 241 outputs a reference oscillation signal to a terminal CL of an up-counter 242 (e.g., TOSHIBA TC4040). The up-counter 242 outputs predetermined oscillation frequency signals Q6' to Q10' synchronously with a signal S(231) from the receiving means 23 in the vehicle steering system. The oscillation frequency of the reference oscillation signal in the vehicle body is the same as that of the reference oscillation signal in the vehicle steering system. An inverter 243 outputs a signal $I_{vn}(Q10')$ in response to the oscillation signal Q10.

Figure 10:
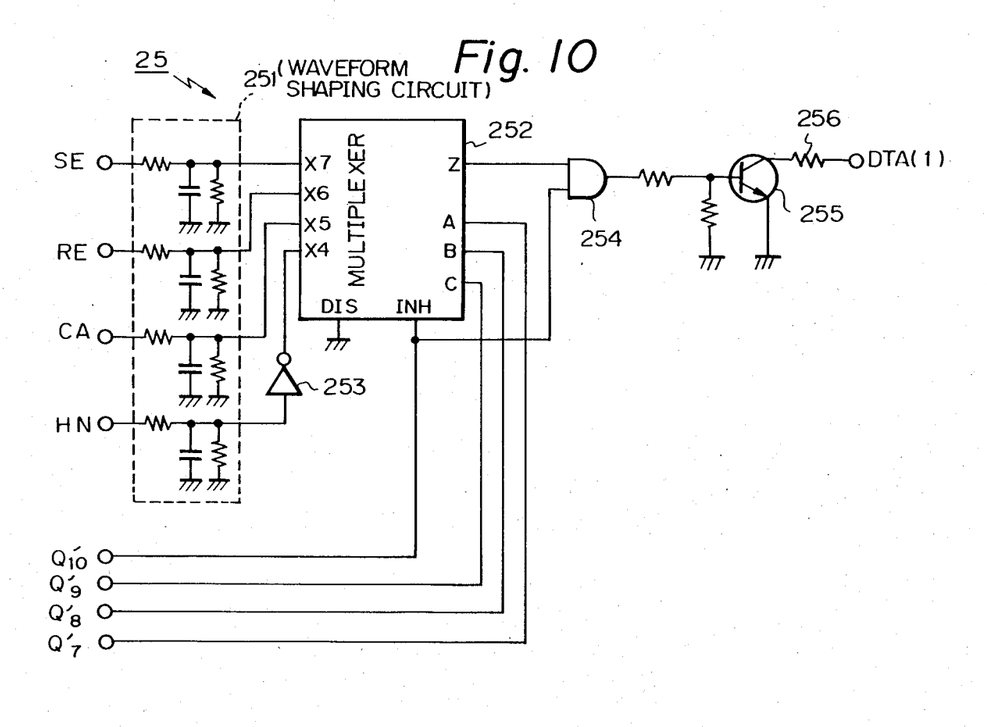
FIG. 10 is a diagram showing the constitution of a transmitting means in the vehicle steering system of the system shown in FIG. 1.
Figure 11:
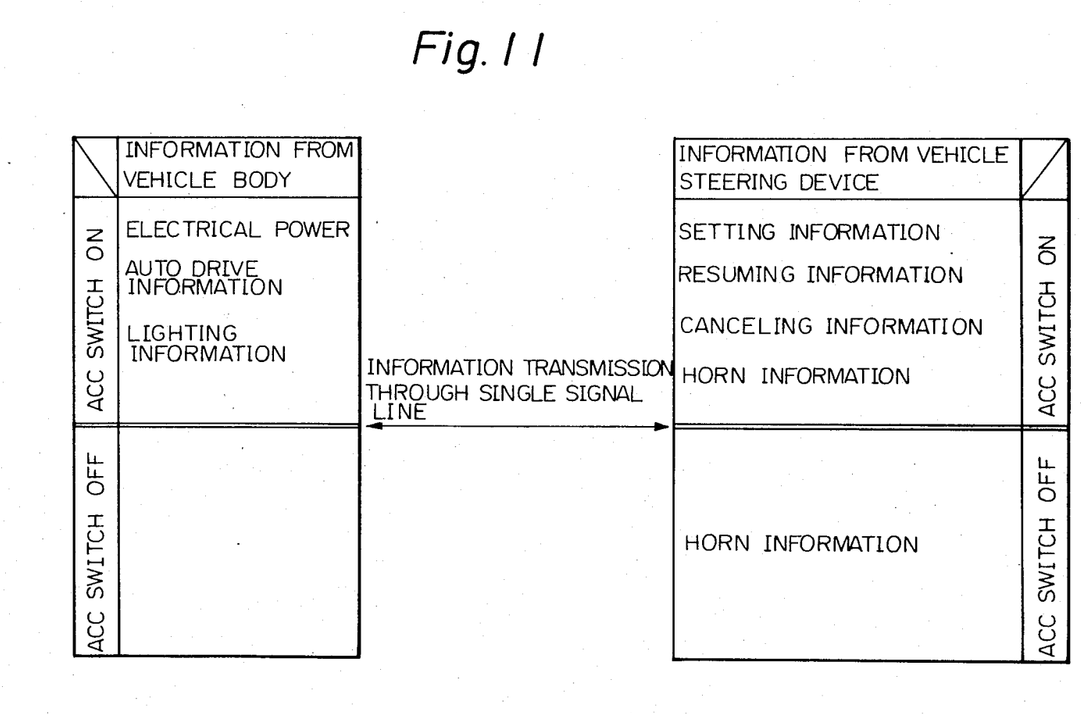
FIG. 11 is a table showing the contents of a plurality of information generated during the operation of the system shown in FIG. 1.

The transmitting means 25 in the vehicle steering system will now be explained with reference to FIG. 10. The numeral 251 represents a waveform shaping circuit comprising resistors and capacitors. The circuit 251 outputs signals to a multiplexer 252 (e.g., TOSHIBA TC4512) and to an inverter 253 in response to setting information, resuming information, canceling information, and horn information from the operation and display portion 41 in the vehicle steering system. The inverter 253 inverts the horn information signal sent from the horn detecting means 22 and outputs the result to the multiplexer 252. The multiplexer 252 converts the information into serial signals according to various oscillation signals from the synchronizing signal generating means 24 in the vehicle steering system, and outputs the result from its terminal.

An AND gate 254 operates a logical product between the serial signals and signal Q10', and outputs the result to a transistor 255. The transistor 255 changes the voltage of the signal DAT(1) through a resistor 256 in response to the setting information (SE), resuming information (RE), canceling information (CA), and horn information (HN). FIG. 5 shows a state in which the setting information and horn information are transmitted to the vehicle body.

The numeral 26 represents a stabilized power supply means in the vehicle steering system which supplies a stabilized power of 5 V to electrical circuits in response to a signal received from the DAT(3) when the ACC switch 62 is in an ON state.

In the embodiment a power consumption of about 100 mA×12 V is used to convert a plurality of information and to transmit electrical power when the ACC switch is in an ON state. When the ACC switch is in an OFF state, only the horn information from the vehicle steering system is transmitted, and the power consumption is then about 1.3 mA×12 V.

Although a preferred embodiment of the present invention has been described heretofore, many modifications of such an embodiment are possible. For instance, the auto drive device, which is an electrical device in the vehicle body in the above explanation, can be replaced by a radio set, an air conditioner, or the like in a vehicle.

Although in the above-described embodiment the information transmitting system has been explained with regard to the transmission of information between the vehicle steering and the vehicle body, it is also possible to apply the present invention to the transmission of information between the electrical devices provided in the same vehicle body.

In the above described embodiments, the ON/OFF of the ignition keyswitch is carried out by the ON/OFF of the ACC contact of the ignition keyswitch. However, if the ignition keyswitch does not have the ACC contact, such ON/OFF can be carried out by the ON/OFF of the ignition (IG) contact.

We claim:

1. An information and electrical power transmission system for a vehicle, comprising:
    a first information transmitting device, having an information sending unit and an information receiving unit, connected to a first group of electrical devices and a power supply circuit having an ignition keyswitch;
    a second information transmitting device, having an information sending unit and an information receiving unit, connected to a second group of electrical devices; and
    a signal line which connects said second information transmitting device with said first information transmitting device for transmitting information and electrical power between first and second information transmitting devices, said information and electrical power being transmitted through said signal line when said ignition keyswitch is in an ON state, and only information which is required to be always transmitted being transmitted through said signal line when said ignition key switch is in an OFF state.

2. A system according to claim 1, wherein said first group of electrical devices and said first information transmitting device are a group of electrical devices and an information transmitting device in the vehicle body.

3. A system according to claim 1, wherein said second group of electrical devices and said second information transmitting device are a group of electrical devices and an information transmitting device in the vehicle steering system.

4. A system according to claim 2, wherein said group of electrical devices in the vehicle body comprises an auto drive device for the vehicle, a circuit for lighting, and a circuit for a horn.

5. A system according to claim 3, wherein said group of electrical devices in the steering system comprises an operational unit for said auto drive device, an electrical display provided in said operational unit, a device for illuminating said operational unit, and a switch for the horn.

6. An information and electrical power transmission system for a vehicle, comprising:
    a power supply circuit having an ignition keyswitch;
    a first group of electrical devices connected to said power supply circuit;
    a first information transmitting device connected to said first group of electrical devices and said power supply circuit said information transmitting device having an information sending unit and an information receiving unit;
    a second group of electrical devices provided remote from said first group of electrical devices on the vehicle;
    a second information transmitting device connected to said second group of electrical devices said second information transmitting device having an information sending unit and an information receiving unit;
    a signal line which connects said second information transmitting device with said first information transmitting device for transmitting a plurality of information and electrical power between said first and second information transmitting device;
    a switching device for the transmitting route which detects an ON/OFF state of said ignition keyswitch and switches to the transmitting route for transmitting said plurality of information and said electrical power between said first and second information transmitting devices through said signal line when said ignition keyswitch is in an ON state and switches to the transmitting route for transmitting only information which is required to be always transmitted between said first and second information transmitting device through said signal line when said ignition keyswitch is in an OFF state; and
    a power reducing device which reduces electrical power supplied to said switching device from said power supply circuit when said switching device is in the switched state after detection of the OFF state of said ignition keyswitch.

7. A system according to claim 6, wherein said first group of electrical devices and said first information transmitting device are a group of electrical devices and an information transmitting device in the vehicle body.

8. A system according to claim 6, wherein said second group of electrical devices and said second information transmitting device are a group of the electrical devices and an information transmitting device in the vehicle steering system.

9. A system according to claim 6, wherein said switching device for the transmitting route is provided in said first and second information transmitting devices.

10. A system according to claim 6, wherein said power reducing device comprises a Zener diode which increases its resistive component when said switching device is in the switched state after detection of the OFF state of said ignition keyswitch.

11. A system according to claim 7, wherein said group of electrical devices in the vehicle body comprises an auto drive device for the vehicle, a circuit for lighting, and a circuit for a horn.

12. A system according to claim 8, wherein said group of electrical devices in the steering system comprises an operational unit for said auto drive device, an electrical display provided in said operational unit, a device for illuminating said operational unit, and a switch for the horn.

* * * * *